(12) United States Patent
Ullmann

(10) Patent No.: US 7,290,889 B2
(45) Date of Patent: Nov. 6, 2007

(54) VIDEO PROJECTION ARRANGEMENT WITH PICTURE STABILIZER

(75) Inventor: Paul Ullmann, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 99 days.

(21) Appl. No.: 10/541,419

(22) PCT Filed: Dec. 22, 2003

(86) PCT No.: PCT/IB03/06305

§ 371 (c)(1),
(2), (4) Date: Jul. 1, 2005

(87) PCT Pub. No.: WO2004/064394

PCT Pub. Date: Jul. 29, 2004

(65) Prior Publication Data
US 2006/0119799 A1 Jun. 8, 2006

(30) Foreign Application Priority Data
Jan. 9, 2003 (EP) .................................. 03100028

(51) Int. Cl.
*G03B 21/14* (2006.01)

(52) U.S. Cl. ........................................ 353/122; 353/69

(58) Field of Classification Search .................. 353/69, 353/100, 122
See application file for complete search history.

(56) References Cited

U.S. PATENT DOCUMENTS

| | | | |
|---|---|---|---|
| 2003/0038927 A1* | 2/2003 | Alden | 353/122 |
| 2003/0038928 A1* | 2/2003 | Alden | 353/122 |
| 2006/0103811 A1* | 5/2006 | May et al. | 353/69 |
| 2006/0256298 A1* | 11/2006 | Knipe | 353/69 |

* cited by examiner

*Primary Examiner*—William C. Dowling

(57) ABSTRACT

An arrangement (2) provided for projecting images, represented by image data, onto a projection surface has a projection system (24) that transmits the images that are to be projected and a scaling unit (22) for scaling the image data and a movement detection device (28) for detecting an undesirable movement of the projection system (24) and for transmitting at least one movement information item (MI) that signifies an undesirable movement of the projection system (24) and a processing device (25) for processing the movement information item (MI) in order to generate a scaling control information item (SCI) as a function of the movement information item (MI) and a scaling influencing stage (33) for influencing the scaling of the image data scaled with the aid of the scaling unit (22), as a result of which an undesirable movement of the images projected onto the projection surface, caused by the undesirable movement of the projection system (24), can at least be reduced.

8 Claims, 2 Drawing Sheets

VIDEO PROJECTION ARRANGEMENT WITH PICTURE STABILIZER

The present invention relates to an arrangement for projecting images, represented by image data, onto a projection surface, which arrangement is equipped with a projection system that transmits the images that are to be projected and with a scaling unit for scaling the image data.

The present invention also relates to a method of projecting images, represented by image data, onto a projection surface, wherein images that are to be projected are transmitted by means of a projection system and the image data are scaled.

An arrangement of the type mentioned above and a method of the type mentioned above are known for example in connection with a home cinema system. In such a known system, a video projector which is set up, for example, in a lounge uses its projection system to project images at a projection height onto a projection wall situated a given distance away from the video projector or onto a projection screen located on the wall. The video projector has a scaling unit, which scaling unit can be used to adjust, inter alia, the size of the projected images.

In general, such a projection wall or such a projection screen is mechanically relatively stable and motionless. On the other hand, problems may arise with video projectors because, depending on the construction or design of a holding or mounting apparatus for the video projector, for example a frame for the video projector, a different mechanical stability in terms of the holding of the video projector is achieved. A stable mechanical design of a holding or mounting apparatus for the video projector is desirable since an undesirable movement of the video projector and of the projection system associated therewith has a direct effect on the projected images, resulting in an undesirable movement of the projected images which is unpleasant for a viewer and is thus disadvantageous. Although a mechanically stable design of a holding or mounting apparatus for the video projector can be achieved by means of relatively bulky and expensive design measures or by increasing the intrinsic weight of a holding or mounting apparatus for the video projector and/or of the video projector, this leads to an inconvenient and impractical solution which limits the freedom in terms of esthetic design of the video projector and is often associated with considerable costs, which is also disadvantageous.

It is an object of the invention to eliminate the above-mentioned drawbacks and to provide an improved arrangement and an improved method.

In order to achieve the above object, an arrangement according to the invention has features according to the invention, so that an arrangement according to the invention can be characterized as follows, namely:

arrangement for projecting images, represented by image data, onto a projection surface, which arrangement has the following means, namely a projection system that transmits the images that are to be projected and a scaling unit for scaling the image data and movement detection means for detecting an undesirable movement of the projection system, it being possible for said movement detection means to transmit at least one movement information item that signifies an undesirable movement of the projection system, and processing means for processing the movement information item, which processing means have a stage for generating a scaling control information item as a function of the movement information item, and scaling influencing means, which can be fed the scaling control information item and which are designed to influence the scaling of the image data, as a result of which an undesirable movement of the images projected onto the projection surface, caused by the undesirable movement of the projection system, can at least be reduced.

In order to achieve the above object, a method according to the invention also has features according to the invention, so that a method according to the invention can be characterized as follows, namely:

method of projecting images, represented by image data, onto a projection surface, in which method the following steps are carried out, namely transmission, by means of a projection system, of images that are to be projected and scaling of the image data and detection of an undesirable movement of the projection system, during which detection at least one movement information item that signifies an undesirable movement of the projection system is transmitted, and processing of the movement information item, during which processing a scaling control information item is generated as a function of the movement information item, and influencing of the scaling of the image data, wherein an undesirable movement of the images projected onto the projection surface, caused by the undesirable movement of the projection system, is at least reduced.

By providing the features according to the invention, an improved arrangement and an improved method are obtained in a very simple way and using simple means. A particular advantage is that an undesirable movement of projected images can at least be reduced and at best can be completely prevented. A further advantage is that such an arrangement is not subject to any particular limitations in terms of mechanical construction measures, and this is particularly advantageous as there is as free a choice as possible in terms of the design of the arrangement according to the invention.

It has proven to be particularly advantageous when the features as claimed in claim 2 are additionally provided in an arrangement according to the invention. As a result it is possible to produce the processing means, for processing the movement information item, in a simple and cost-effective manner.

In principle, the movement detection means may be designed to detect an undesirable movement of the projection system in all spatial directions and to transmit corresponding movement information in relation to this. However, it has proven to be particularly advantageous when the features as claimed in claim 3 are additionally provided in an arrangement according to the invention. This is particularly advantageous with regard to a simple structural design of the movement detection means and of the processing means for processing the movement information item.

The movement detection means may have one or more photosensors provided in the region of the projection surface and one or more video cameras directed at the projection surface, which can be used to detect or ascertain an undesirable movement of the respectively projected image and which can be used to generate at least one movement information item. However, it has proven to be particularly advantageous when the features as claimed in claim 4 and possibly also the features as claimed in claim 5 are additionally provided in an arrangement according to the invention. This allows the movement detection means to be designed in a manner which is simple and cost-effective and allows them to deliver an accurate movement information item.

The above-described aspects and further aspects of the invention emerge from the example of an embodiment described below and are explained using said example of an embodiment.

The invention will be further described with reference to an example of an embodiment shown in the drawings to which, however, the invention is not restricted.

Figure 1:
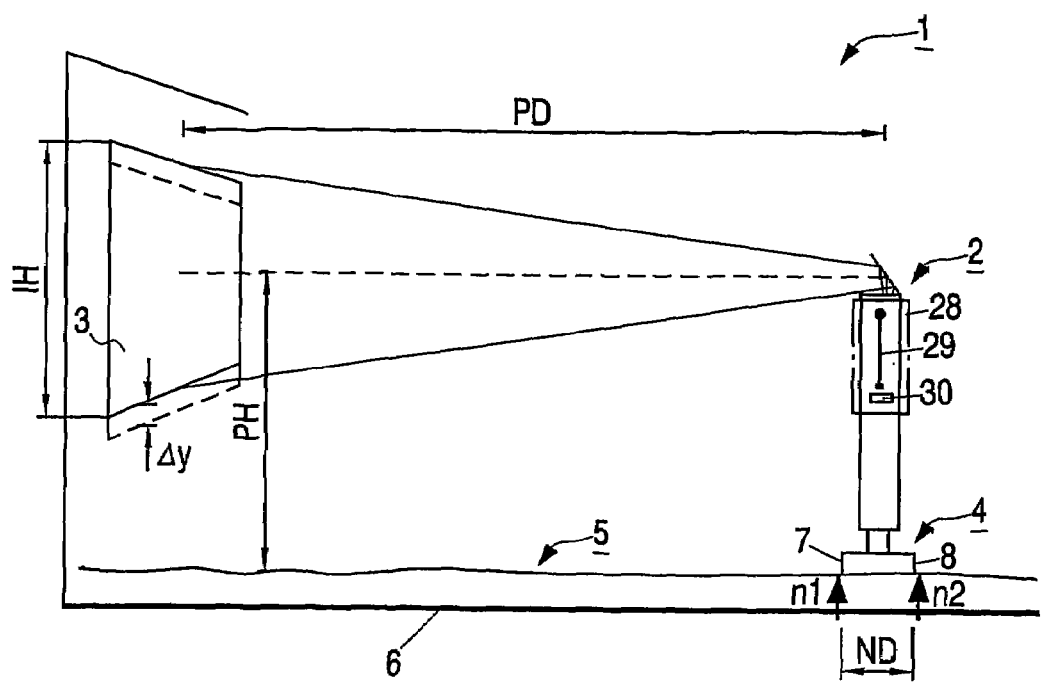
FIG. 1 shows a structure, in principle, of what is known as a home cinema system having an arrangement according to the invention, which in this instance is formed by a video projector.

FIG. 1 shows a home cinema system 1. The home cinema system 1 comprises an arrangement for projecting images, represented by image data, onto a projection surface, which arrangement is in this case formed by a video projector 2. The video projector 2 has a projection system that transmits the images that are to be projected. The projection surface is formed by a projection wall 3 which is kept a projection distance PD away from the video projector 2, wherein in the present case projection onto the projection wall 3 is effected at a projection angle which is normal to the projection wall. It may be mentioned that projection may likewise be effected at a different projection angle, that is to say that it is possible to implement what is referred to as "off-axis" projection.

The video projector 2 has a footed construction 4, by means of which footed construction 4 the video projector 2 can stand on a floor construction 5. The footed construction 4 in this case has a first foot part 7 and a second foot part 8, wherein the first foot part 7 has a first bearing point 7a and a second bearing point 7b and wherein the second foot part 8 has only one bearing point 8a. The bearing point 8a has a normal distance SD with respect to the connecting line between the two bearing points 7a and 7b.

The floor construction 5 rests on a fixed floor 6 and is designed as a "floating" construction and therefore has a certain degree of flexibility under mechanical loads, resulting in a certain tendency to oscillate. In this case, the floor construction 5 consists of a carpet lying on a floating wooden floor, of a vapor barrier and of pugging, which vapor barrier and pugging are located between the wooden floor and the fixed floor 6. It may be mentioned that the floor construction 5 may likewise be of a different design, but one which still has such a certain degree of flexibility and consequently a tendency to oscillate.

Figure 2:
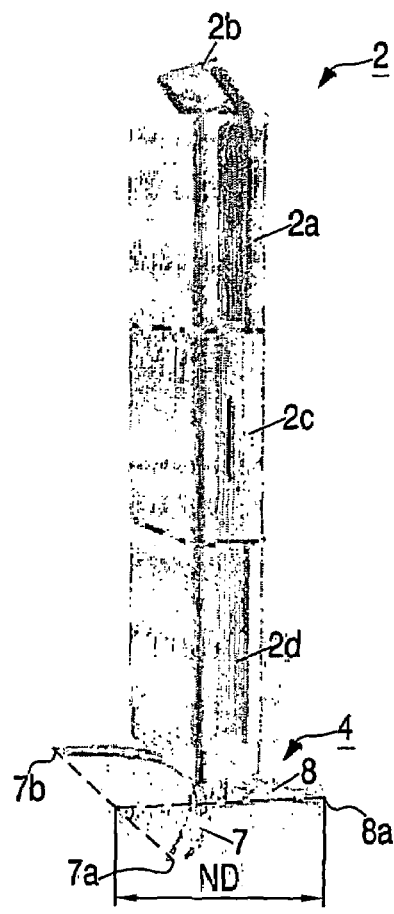
FIG. 2 shows, in an oblique view, an implemented variant embodiment of the video projector shown in FIG. 1, which has a video projection unit.

As can be seen from FIG. 2, the video projector 2 is designed as a standing unit. The video projector 2 consists of a video projection unit 2a having a deflection mirror 2b and a DVD playback unit 2c, and of an amplifier unit 2d. The DVD playback unit 2c is designed to play back DVDs, wherein a video signal with image information is transmitted to the video projection unit 2a and a sound signal associated with the video signal is transmitted to the amplifier unit 2d. The amplifier unit 2d is in this case designed to transmit the sound signal to loudspeaker boxes, which are not shown in any more detail. It may be mentioned that other playback means for transmitting a video signal with image information may also be used, for example a magnetic tape video playback device, a video CD playback device, a television receiver, a satellite signal receiver or a video games console.

The video projection unit 2a is designed to project the image information of the video signal onto the projection wall 3 via the deflection mirror 2b, wherein images are projected onto the projection wall 3 with an image height IH, to be specific at a vertical projection height PH above the floor construction 5.

On account of the design of the video projector 2 or of the footed construction 4, it is possible for relatively small floor movements of the floor construction 5 to lead to an undesirable movement of the video projector 2 and consequently of its video projection system, and this results in an undesirable movement of the projected images on the projection wall 3 unless the measures according to the invention as described in more detail below are provided. For example, such floor movements may be caused by items in the vicinity of the arrangement being moved, such as a chair, a sofa or a table, or simply by people or animals moving over the floor construction. This may result in a difference in level of the feet 7 and 8, wherein the first foot part 7 may end up at a level n1 and the second foot part 8 may end up at a level n2 that is different from the level n1. Such effects of floor movements are illustrated below using a simple computational example.

In the present case the image height IH is 1.1 m, the projection distance PD is 3.5 m and the standard distance is 0.4 m. A tilting angle $\epsilon$, which is representative of the excursion of the video projector 2 from the vertical, is calculated using the following trigonometric relationship: $\sin \epsilon = (n1-n2)/FD$, where $(n1-n2)$ represents the difference in level between the two levels n1 and n2.

According to the example shown, for a difference in level of $(n1-n2)=3$ mm, there is a tilting angle of $\epsilon=0.43°$. A vertical displacement $\Delta y$ of a projected image on the projection wall 3 consequently arises on account of the trigonometric relationship as shown in the following simple equation: $\Delta y = PD * \tan \epsilon$. In the present example there is a vertical displacement of the image of $\Delta y = 2.6$ cm.

Figure 3:
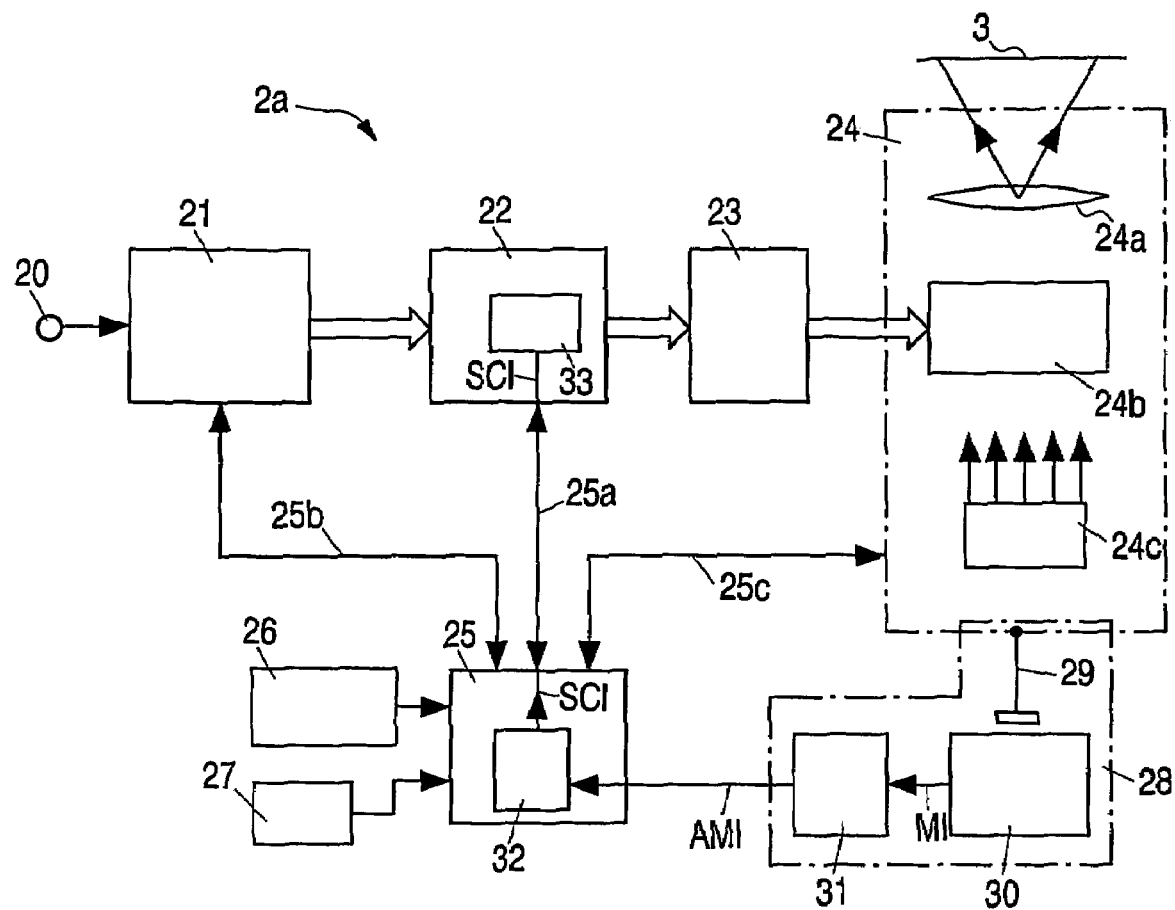
FIG. 3 shows, in the form of a block diagram, the video projection unit of the video projector shown in FIG. 2, which is designed to project images in accordance with the invention.

FIG. 3 shows, in the form of a block diagram, the essential functional units of the video projection unit 2a. The video projection unit 2a has a video signal input stage 21, which video signal input stage 21 is designed to receive an analog video signal VS and to generate and transmit a digitized video signal. The digitized video signal can be fed to a scaling unit 22, which scaling unit 22 is designed to scale and process the digitized video signal and to transmit a processed video signal. The processed video signal can be fed to a projection system 24 via an LCD driver stage 23, which projection system 24 is designed to optically transmit the processed video signal. For this purpose, the projection system 24 has an optical unit 24a, a liquid crystal display board 24b and a light source 24c. The scaling unit 22 has an OSD stage, not shown in any more detail, and an image distortion correction stage, which OSD stage is designed to generate menu image data and which image rectification stage is designed to rectify images that are projected in a distorted manner, said images that are projected in a distorted manner possibly arising in the case of "off-axis" projection. In this connection, reference may be made to the disclosure of Patent US 2002/0060754 A1, which was published before the present patent and which is hereby incorporated by way of reference.

The video projector 2 furthermore has a microcontroller 25, which is designed to control the video signal input stage 21, the scaling unit 22 and the projection system 24. The scaling unit 22 is controlled via a UART interface connection 25a. An infrared receiver 26 and a keyboard 27 are also connected to the microcontroller 25, which infrared receiver 26 and which keyboard 27 are designed to transmit control and navigation signals (e.g. for navigating an OSD). It should furthermore be mentioned that a first BUS connection 25b is provided between the microcontroller 25 and the video signal input stage 21 and that a second BUS connection 25c is provided between the microcontroller 25 and the projection system 24, which two BUS connections 25b and 25c are provided essentially for control purposes.

The microcontroller 25 is designed as a microcomputer and has a central processing unit (CPU), which is not illustrated in any more detail, and memory means (RAM, ROM). The microcontroller 25 forms a stage for generating a scaling control information item, which in this case is formed by a conversion stage 32 which is not described in any greater detail below.

The video projector 2 furthermore comprises movement detection means 28, which are designed to detect an undesirable movement of the video projector 2. The movement detection means 28 have a pendulum 29 and a pendulum movement detector which interacts with the pendulum 29, which pendulum movement detector is in this case formed by a Hall sensor 30. It may be mentioned that the pendulum movement detector may likewise be formed by other means, for example by a light barrier system.

The pendulum 29 is designed as an aperiodic pendulum, and is mechanically connected to the video projector 2, in the present case directly to the projection system 24 of the video projector 2. The pendulum 29 is designed, together with the Hall sensor 30, to detect a tilting and/or excursion of the projection system 24 of the video projector 2 out of a starting position. The Hall sensor 30 is designed to determine an oscillating movement of the pendulum and transmits a movement information signal MI to analog movement signal amplification means 31, which movement information signal MI signifies the tilting and/or excursion of the projection system 24 of the video projector 2 and consequently of the entire video projector 2.

The analog movement signal amplification means 31 are designed to transmit an adapted movement information signal AMI, which adapted movement information signal AMI is transmitted to the conversion stage 32 of the microcontroller 25. The conversion stage 32 is designed to convert the adapted movement signal AMI into a pixel displacement information item SCI.

The scaling unit 22 has scaling influencing means 33, by means of which scaling influencing means 33 the scaling and processing of the digitized video signal can be influenced. In the present case, the scaling influencing means 33 are designed to receive the pixel displacement information item SCI transmitted by the conversion stage 32 and to carry out, in accordance with this pixel displacement information item SCI, a displacement of the image data in the direction of the image height IH, that is to say, in accordance with the above-described computational example, to carry out a displacement of the pixels in accordance with the vertical image displacement of 2.6 cm, wherein this displacement corresponds to a number of pixels that depends on the pixel size selected. A conversion, carried out with the aid of the conversion stage 32, into a pixel value p is effected in accordance with the following equation: $p=\text{int}(Rv*\gamma)$, where Rv is the vertical resolution of a displayed or projected image in pixels and $\gamma$ is the vertical displacement of such an image in relation to the image height IH, that is to say is given by the equation $\gamma=\Delta y/IH$. It should also be mentioned that 'int' means integer. According to the above-described example, for the determined vertical image displacement of 2.6 cm and an assumed vertical resolution Rv of 480 pixels, the result is a pixel value p of 12 pixels. As a result, the pixels representing such images are displaced by in each case 12 pixels in the vertical direction. Advantageously, this means that, despite an undesirable movement of the video projector 2 and hence of the projection system 24, an undesirable movement of the respectively projected image or of the successive images can be prevented or at least greatly reduced.

It may be mentioned that the movement detection means do not have to be coupled directly to the projection system, but rather they can also be connected to other components or structural units of the video projector that are mechanically connected to the projection system.

It may furthermore be mentioned that the scaling influencing means 33 do not necessarily have to be contained in the scaling unit 22, but rather may be connected downstream of the scaling unit 22 or upstream of the scaling unit 22.

It may be mentioned that the scaling unit 22 can be used to compensate for a response time, which response time may be caused, for example, by the time lag of the movement detection means 28 when detecting the undesirable movement of the projection system 24.

It may furthermore be mentioned that the movement detection means may be formed by measuring means, which measuring means operate on the principle of measuring the electrolytic conductivity of a liquid by means of electrodes fitted in a planar fashion on a substrate. In this case, electrodes are applied parallel to the tilting axis of the measuring means on the base of an electrolyte chamber which is partially filled with an electrically conductive liquid. When an AC voltage is applied between two electrodes, a current flows through the liquid in the form of a stray field. A reduction in the level of liquid during tilting of the measuring means constricts this stray field and, given constant specific conductivity of the electrolyte, a resistance is set up as a function of the liquid fill level. If electrodes are arranged in each case in pairs on the right-hand and left-hand halves of the base of such a measuring cell, in relation to the tilting axis, then the fundamentally known differential measurement principle delivers a signed angle of inclination. Such measuring means have been produced by the company HL-Planartechnik GmbH and are commercially available under the reference NS25/E or NS15/E.

It may furthermore be mentioned that the movement detection means may be designed to detect an acceleration. Such movement detection means are commercially available in various variant embodiments; for example the thermodynamic inclination and acceleration sensor TDNS from the company Vogt-Electronic AG is commercially available.

The invention claimed is:

1. An arrangement for projecting images represented by image data onto a projection surface, comprising:
    a projection system that transmits the images that are to be projected;
    a scaling unit for scaling the image data;
    a motion detector capable of transmitting at least one movement information item including information about undesirable movement of the projection system, the motion detector including a pendulum mechanically connected to the projection system and a pendulum movement detector that interacts with the pendulum to detect an excursion of the pendulum indicative of the undesirable movement of the projection system;
    a processor capable of processing the movement information item, including a stage for penetrating a scaling control information item as a function of the movement information item; and scaling influencing means that can influence scaling of the image data based on the scaling control information item to reduce undesirable movement of the projected images due to the undesirable movement of the projection system.

2. The arrangement of claim 1, wherein the stage for generating the scaling control information item is formed by conversion means that are fed the movement information item and that generate a pixel displacement information item as the scaling control information item.

3. The arrangement of claim 2, wherein the scaling influencing means comprise pixel displacement means.

4. The arrangement of claim 1, wherein the undesirable movement of the projected images is in the direction of image height.

5. An arrangement of claim 1, wherein the pendulum movement detector comprises a Hall sensor.

6. The arrangement of claim 1, wherein the scaling influencing means comprise pixel displacement means.

7. The arrangement of claim 5, wherein the scaling influencing means comprise pixel displacement means.

8. The arrangement of claim 4, wherein the scaling influencing means comprise pixel displacement means.

* * * * *